Aug. 16, 1932.  U. V. D'ANNUNZIO ET AL  1,871,590
APPARATUS FOR EXTRACTING JUICE FROM FRUITS
Filed April 4, 1931   7 Sheets-Sheet 2

INVENTOR
Gino Ginzi
Ugo V. D'Annunzio
BY their ATTORNEY

Patented Aug. 16, 1932

1,871,590

UNITED STATES PATENT OFFICE

UGO V. D'ANNUNZIO, OF NEW YORK, N. Y., AND GINO FINZI, OF MILAN, ITALY

APPARATUS FOR EXTRACTING JUICE FROM FRUITS

Application filed April 4, 1931. Serial No. 527,818.

This invention relates to the art of extracting juice from fruits and more particularly refers to improvements in apparatus for extracting juice from citrus fruits such as oranges, lemons, etc.

Devices employed for this purpose generally comprise a ribbed conoidal bulb which is gradually forced within the half orange or lemon while either the bulb itself or the halved fruit is rotated causing an abrasive action to take place between the ribs of the bulb and the juicy substance of the fruit.

We have found that although machines of this type are adapted for very quick operation, and extract practically all the juice from the fruit, they are to a certain extent objectionable in various respects. For instance, the juice obtained by the use of these machines will usually contain in suspension a large number of tiny whitish particles due to the grinding of the white stratum of the skin, and at times even pieces of seeds. Besides marring the taste of the juice, these particles detract from the health giving qualities of the drink and cause the same to acquire an unattractive cloudy appearance. The main fault of this method of juice extraction however, lies in the impossibility of utilizing even to a small degree the essential and aromatic contents of the external colored portion of the skin, which are richest in vitamins and are at the same time richest in flavor.

Another objection is that when the halved fruit is pressed by hand against a rotating bulb, the fruit is subjected to too much handling. Still another objection is that as a rule particles of seeds and of the fibrous components of the fruit will adhere to the surface of the bulb at least until they are detached when a new drink is subsequently prepared. If the machine should remain idle for any length of time, these adhering particles may spoil and impart to the drink a disagreeable taste.

This application refers partly to new subject matter and partly to subject matter shown and described in another application for patent entitled "Methods of extracting juice from citrus fruits", filed May 3, 1930 Serial No. 449,421, copending herewith.

The primary object of the present invention is to provide a novel and improved type of apparatus whereby the juice contained in a citrus fruit may be completely extracted in a clear condition, entirely free of solid particles originating from the breaking up of the seeds or skin.

Another object is to provide a novel and improved type of apparatus whereby the entire juice contents of a citrus fruit may be extracted in a clear condition, said apparatus including means insuring a rapid and efficient cleansing of all the surfaces coming into contact with the fruit juice and with the essential and aromatic substances contained in the rind.

A further object is to provide in an apparatus of the class described means for extracting from a citrus fruit both the juice contained in its pulp and the essential and aromatic substances contained in its rind, and means for effectively collecting and discharging both the juice and said essential and aromatic substances.

An additional object is to provide a device of the class specified adapted to be operated by running water under pressures such as are ordinarily found in most systems of water supply.

Other objects and advantages of the present invention will more fully appear as the description proceeds and will be set forth and claimed in the appended claims.

According to our method the fruit from which the juice is to be extracted is not cut in half but is placed whole within a chamber where it is subjected to pressure while one of its ends is split in the center and preferably also along a number of directions radiating therefrom, in order to facilitate the gradual compression and ultimate flattening of the fruit.

While the fruit is subjected to pressure the juice filters through the slits produced through its skin by suitably sharp elements provided in the machine, but the seeds and other solid matters remain imprisoned within the flattened skin, so that the refuse matters will ultimately be compacted in a single disk shaped lump which can be easily removed and dumped out.

The pressure is applied to the fruit externally and this results in the squeezing out not only of the juice contained in the pulp but also of part of the essential and aromatic oils contained in the skin. A drink prepared with the juice thus extracted will therefore be rich in vitamins and will also have a flavor which cannot possibly be obtained when machines of the revolving bulb type are employed.

Although the required pressure may be exerted by hand or by power operated means, we prefer to utilize the pressure of the water delivered by any ordinary supply system. This permits of reducing to a minimum the working parts of the machine and also of reducing its operation to the simplest possible form.

This also makes it unnecessary to operate the machine by means of an electric motor and therefore obviates the dangers arising from the fact that it is not always possible to maintain the best conditions of insulation where large quantities of water are continuously used.

Various ways of carrying our invention into practice are illustrated by way of example in the accompanying drawings, in which:—

The device illustrated in Figs. 1 to 7 comprises a base 20, preferably formed with a depression 21 forming a support for a glass or similar receptacle, a stand or upright 22 upwardly projecting from one side of said base, and an overhanging body portion 23 carried by said upright. Said body portion is vertically spaced from and located directly above depression 21, and is formed with a supporting flange 24 over which can be placed a dome 25 made of glass or any other suitable material, preferably shaped to simulate an orange, to indicate the use for which the device is intended. The lower central part of 26 of the body portion forms a vertical pressing chamber 27 open at its lower end, formed with an outwardly flaring mouth 28, said mouth forming, with a removable bottom 29, a relatively shallow circumferential extension 30 of the pressing chamber.

The gradual enlargement of the diameter of the pressing chamber leading to the formation of the said circumferential extension, makes it possible for the diameter of the fruit to gradually increase as the pressure exerted against it increases, so as to finally acquire the shape of a relatively flat disk. This is a rather important features of our apparatus because too sharp a change in the diameter of the pressing chamber would engender a considerable resistance to the deformation of the fruit and would interfere with the proper functioning of the device.

Bottom part 29 is designed for quick insertion in or removal from the position shown in Figs. 1, 2, 4, 5, 6, in which it is shown forming a closure for the open end of chamber 27. The inner surface 31 of said bottom part is preferably slightly inclined downwardly towards a center outlet 32.

Bottom part 29 is also provided at the center with an upwardly projecting spiked member 33 made integral with supporting ribs 34 forming openings therein through which the juice can flow to outlet 32. By virtue of this arrangement, a citrus fruit such as a lemon or an orange may be forced over spiked member 33, when bottom part 29 is detached from the device and can then be inserted within the pressing chamber while bottom part 29 is set in its closing position.

Bottom part 29 may be secured in position by a slight twist, and to this end it is preferably formed with a flanged portion 35 having an inner circular groove 36, the upper surface of said flange having vertical slots or passages such as 37 through which may be inserted lugs such as 38 outwardly projecting from the lower end 26 of the body.

Figure 4:
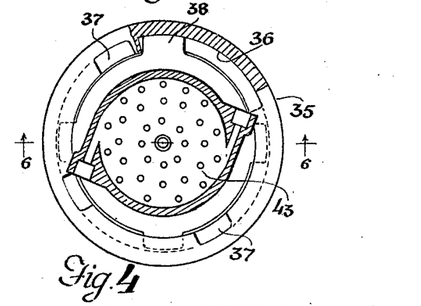
Fig. 4 is a horizontal section partly broken away through line 4—4 of Fig. 5 showing the manner of inserting and retaining the removable bottom in position.

Bottom part 29 is shown in its operative position in Fig. 4. From the same it is apparent that if said bottom part is displaced a certain angular distance in a clockwise direction from the position shown, openings or slots 37 will come to register with lugs 38 and part 29 can then be moved away from the lower end of part 26. Thus, a quick detachable connection is formed between the bottom part or member 29 and the chamber 27.

Figure 1:
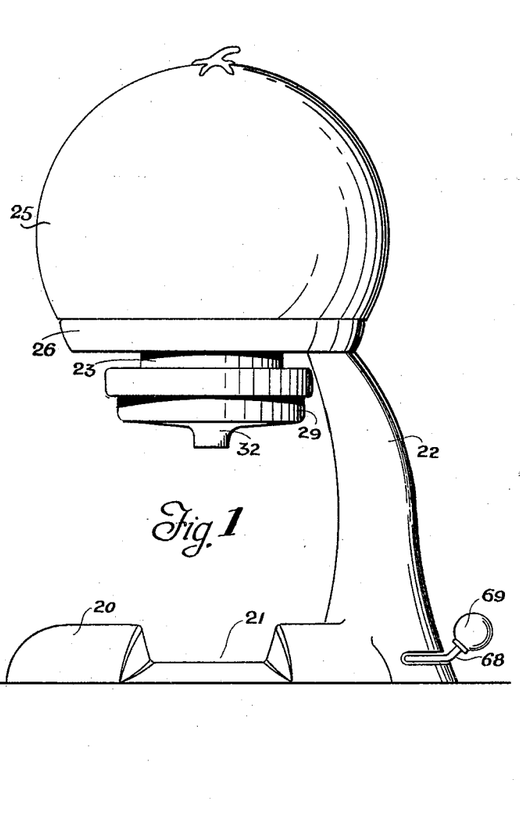
Fig. 1 is a side elevation illustrating the general appearance of a device embodying our invention.
Figure 2:
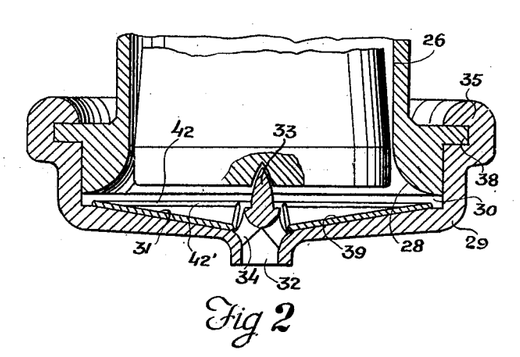
Fig. 2 is a fragmentary vertical section in an enlarged scale of the lower part of the pressing chamber showing the removable bottom therefor.
Figure 3:
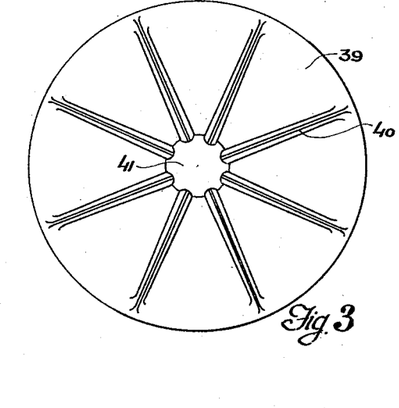
Fig. 3 is a plan view of a removable disk provided with a plurality of radial ribs formed with a cutting edge, adapted to be placed upon the removable bottom.

Before the fruit is inserted over spiked member 33, a removable disk is preferably placed within the bottom portion 29, said disk being preferably of the type shown in Figs. 2 and 3 where 39 designates the body of the disk which is slightly funnel shaped to fit the inner surface 31 of bottom part 29, and 40 designates a plurality of ribbed members radially extending over body portion 39 from a central opening, 41 and upwardly projecting from said body portion, said rib members being formed with a cutting upper edge 42.

Figure 5:
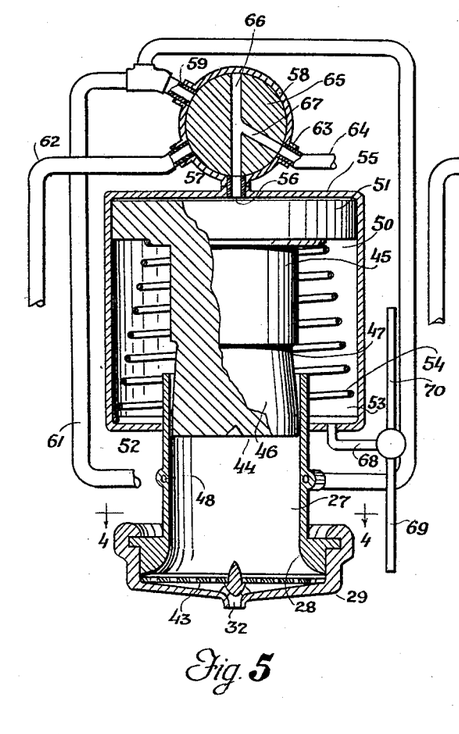
Fig. 5 is a partly diagrammatic vertical section of the operating parts of a hydraulically operated device embodying some of the features of our invention; showing the pressure exerting member in its retracted position.
Figure 6:
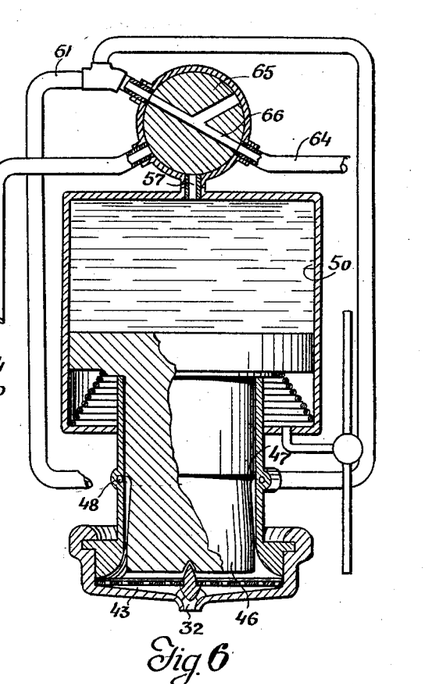
Fig. 6 is a similar view illustrating the pressure exerting member in its pressure applying position.

Although we prefer in most cases to use a ribbed disk such as shown in Figs. 2 and 3, it is possible if desired to use instead a perforated disk 43 as shown in Figs. 4, 5, 6, although such an arrangement is not as effective and requires the use of greater pressure. A plunger or pressure exerting member 44 is provided at the upper end of chamber 27, said member 44 being mounted for vertical downward displacement within said chamber.

Said plunger or pressure exerting member is preferably composed of an upper portion 45 the diameter of which is substantially equivalent to the diameter of chamber 27, and a lower portion 46 the lower diameter of which is slightly smaller so as to provide a clearance between said lower portion and the inner surface of chamber 27, the surface of lower portion 46 being furthermore slightly inclined inwardly to form with the lower end of portion 45 a shoulder 47. Said plunger 44 thus has a reduced portion 46 adjacent the pressure-applying face thereof, and an annular passage is formed between the reduced portion of the plunger and the wall of the chamber 27. Chamber 27 is provided with one or more side inlets 48 located just below shoulder 47 when pressure exerting member 44 occupies its lowermost position shown in Figs. 2 and 6. Said inlet or inlets are preferably directed at a tangent to the circumference of chamber 27, so that the fluid jet or jets issuing therefrom will acquire a whirling movement at high speed against the surface of said chamber, so as to not only exert a dissolving action upon the impurities adhering to said surface, but also and principally a mechanical cleansing action forcing all liquid and solid matters adhering thereto away from said surface. This feature is clearly shown in Fig. 4.

As stated, when bottom portion 29 is in its closing position its inner surface 31 is vertically spaced from the open mouth of chamber 27 and forms therewith a shallow laterally extending chamber 30 which provides room for the increased diameter acquired by the skin of the fruit when in its flattened condition. It will be observed that the height of rib members 40 is such that when the pressure exerting member reaches its lowermost position a clearance 42' (see Fig. 2) remains between the cutting edges of said rib members and the bottom surface of the pressure exerting member.

Figure 8:
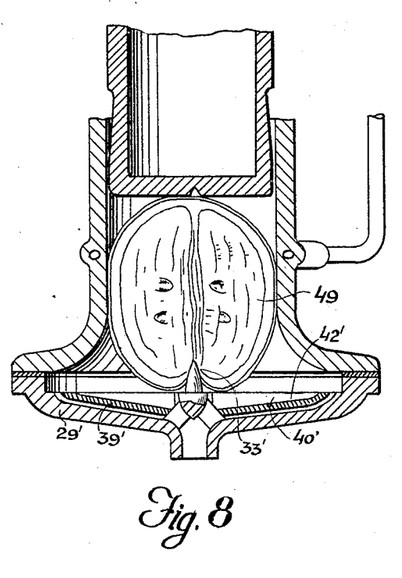
Fig. 8 is a fragmentary vertical section of the lower part of the pressing chamber, showing the pressure exerting member at the beginning of its downward stroke, illustrating a bottom portion of a somewhat different design.
Figure 9:
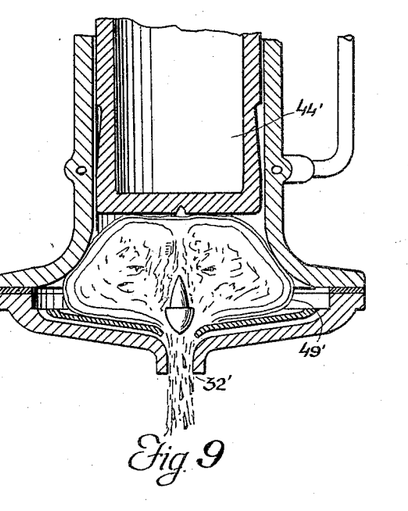
Fig. 9 is a similar view illustrating the pressure exerting member at an intermediate position of its downward stroke.
Figure 10:
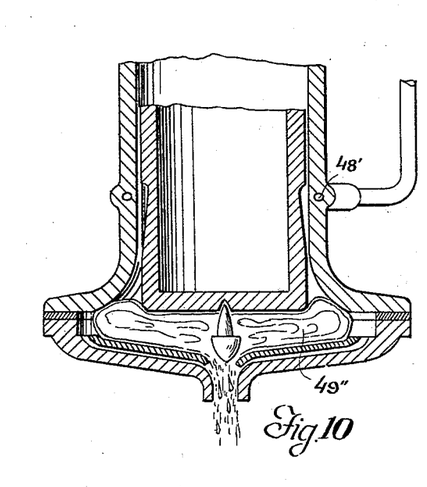
Fig. 10 is a similar view illustrating the pressure exerting member at the end of its downward stroke.

This insures a condition whereby the cutting edges will be prevented from going through the upper half of the flattened rind. The rind can therefore subsequently be removed from the device in the form of a substantially rigid disk within which are retained the seeds and the refuse matter. Figs. 8, 9, 10 show the fruit at various stages of the pressing operation. In Fig. 8 it is seen how a lemon or orange 49 after having been placed upon spiked member 33' of detachable bottom part 29', has been inserted within the pressing chamber.

In Fig. 9 the pressure exerting member 44' has been forced downwardly, pressing the fruit and forcing it to extend laterally as shown at 49', the juice coming out of the outlet 32'. The next stage of the pressing operation is shown in Fig. 10 where the skin of the fruit has been completely flattened out causing it to acquire a discoidal shape as shown at 49'', the flattened skin retaining all the seeds and solid matters contained in the fruit, while the juice filters through the interstices between the edges of the slits produced by cutting edges 42' and the sides of ribbed members 40'.

Figure 11:
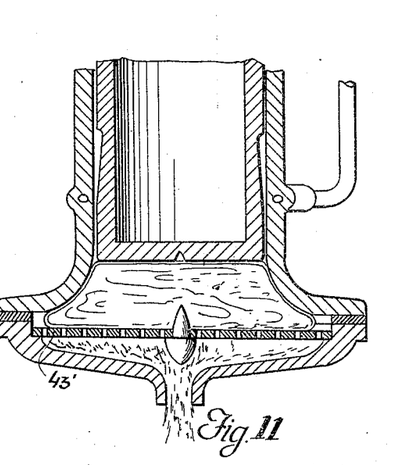
Fig. 11 is a view similar to that of Fig. 9 showing a perforated disk used in place of the radially ribbed disk shown in Figs. 8, 9, 10.

In Fig. 11 is shown an intermediate stage of the pressing stroke where a perforated disk 43' is used in place of the ribbed disk 39'. In this case the pressure required is somewhat higher than that called for when a ribbed disk is employed because the fruit is only punctured in the center by the spiked member carried by the detachable bottom part. After the pressing operation has been completed, and the pressure exerting member is in the position shown in Fig. 10, it is desirable to admit water under pressure through inlet 48' in order to discharge whatever juice may be left in the pressing chamber, and at the same time rinse and clean the surfaces of said chamber.

After this the bottom part may be detached together with the refuse, and the latter can be quickly dumped out together with the detachable disk, this being replaced by a new disk, when making ready for a new operation.

The operations so far described are carried out in all types of machines embodying our invention, the method of operating said machines varying however, according to the kind of power used. As stated in the premises we prefer to utilize for the operation of the pressure exerting member, the pressure of the water obtainable from any ordinary water supply system.

Fig. 1 and Figs. 4 to 7, illustrate a device designed for operation by hydraulic pressure. In said drawings the pressing chamber 27 which is open at the top in order to admit the pressure exerting member, projects downwardly from a piston chamber 50 within which may move a piston 51 integral with the pressure exerting member 45—46. The upper part of chamber 27 projects upwardly from the bottom 52 of the piston chamber forming therewith an annular collecting chamber 53.

A spring 54 interposed between the bottom of the piston chamber and the lower surface of the piston normally holds the piston and the pressure exerting member depending therefrom in their raised position shown in Fig. 5.

The top 55 of the piston chamber is provided with an inlet 56 through which water under pressure may be admitted to force down the piston against the action of spring 54. Said inlet is connected to one of the outlets 57 of a multiple way valve 58 which is provided with two other outlets 59, 60 connected by a tube 61 to inlet 48 and by a tube 62 to a place of discharge, respectively.

Said valve also is provided with an inlet 63 to which leads a water supply pipe 64, which may be connected to a water supply system in any suitable manner. Said valve also comprises a three way cock 65 having a cross passage 66 adapted to establish direct communication between inlet 63 and outlet 59 and having a branch passage 67 adapted together with passage 66 to establish communication between inlet 63 and outlet 57 or between outlet 57 and outlet 60. Said three way cock can be operated by means of a lever 68 provided with a ball handle 69 shown in Fig. 1.

In Fig. 5, the cock is shown in position where water supplied through pipe 64 is admitted to the piston chamber through passages 67, 66. Due to the pressure of said water, the piston will be forced downwardly against the action of spring 54 to the position shown in Fig. 6, so that if an orange or lemon is inserted within chamber 27, it will be pressed between the lower surface of the pressure exerting member 44 and the ribbed or perforated disk 31 or 43. By properly proportioning piston 51 the device can be arranged to operate efficiently under all pressures normally used in water supply systems, that is, between 20–80 pounds per square inch.

After the juice has been forced out of the fruit, the pressure exerting member having reached the position shown in Fig. 10, a spray of water is admitted to chamber 27 through inlet 48, said water rinsing the inside of chamber 27 and being discharged together with the residue of the juice within the glass or container underneath. This is done by turning cock 65 in a counterclockwise direction from the position shown in Fig. 5 to the position shown in Fig. 6 where direct communication is established by passage 66 between supply tube 64 and spray tube 61.

Due to the small clearance between the outer surface of part 46 of the pressure exerting member and the internal surface of chamber 27, the water admitted through inlet 48 will acquire a whirling motion and a high velocity around chamber 27 and will thus efficiently rinse all parts of said chamber. The inlet 48 thus constitutes means for admitting liquid to the passage between the chamber and the plunger when the latter is in pressure-applying position, as shown in Fig. 6.

While water is thus admitted to chamber 27 the piston 51 and the pressure exerting member remain in their depressed position because the discharge of the water contained within the piston chamber is prevented by cock 65 blocking valve outlet 57.

Figure 7:
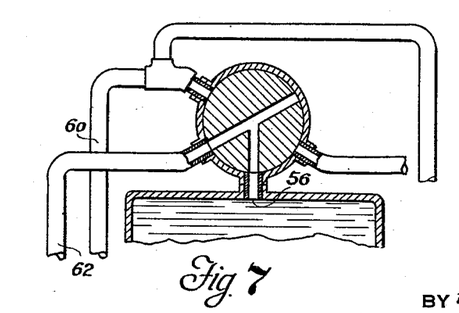
Fig. 7 is a detail diagrammatic view illustrating the multiple way valve in the position where water may be discharged from the piston chamber.

As soon as the operator deems the water discharge through the outlet 32 to be sufficient for the requirements of the drink being prepared, he actuates lever 68 so as to turn cock 65 in a clockwise direction from the position shown in Fig. 6 to the position shown in Fig. 7, where direct communication is established between inlet 56 and discharge tube 62 by the passages 67—66 of the cock. Spring 54 is then free to expand, forcing piston 51 upwardly to the position shown in Fig. 5 while water is being expelled from the piston chamber through exhause pipe 62.

This being done, the removable bottom part 29 is detached and the refuse together with the removable disk is dumped out as previously explained. The device is thus ready for the next operation.

If any water should leak through between the side surface of the piston and the inner surface of chamber 50, it will collect within annular space 53 and will be discharged therefrom through outlet pipes 68—69, provided with a vent 70.

Figure 12:
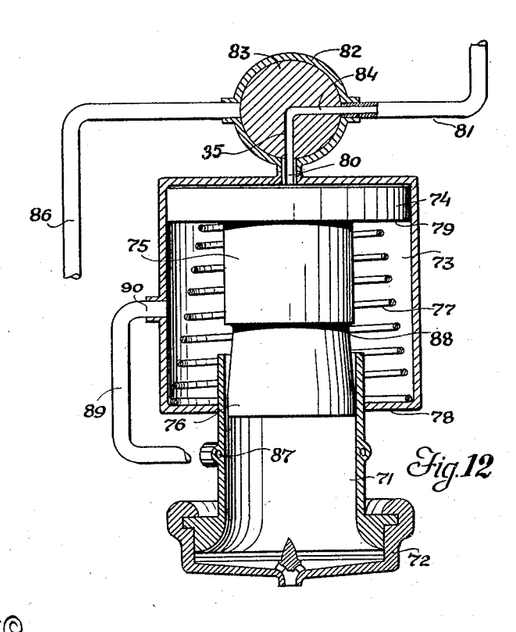
Fig. 12 is a partly diagrammatic vertical section of the operating parts of a hydraulically operated device of a somewhat modified design.

A hydraulically operated device of a somewhat different type is shown in Fig. 12 where 71 designates the pressing chamber provided with a removable bottom part 72, 73 designates the piston chamber, 74 the piston, and 75—76 the pressure exerting member depending from said piston. Like in the previous case, a spring 77 is interposed between bottom 78 of chamber 73 and the lower surface 79 of the piston, said spring normally retaining piston 74 and pressure exerting member 75—76 in their uppermost position shown.

Figure 13:
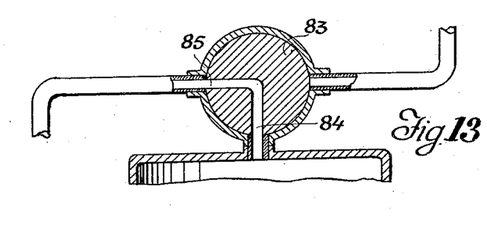
Fig. 13 is a fragmentary partly diagrammatic vertical section illustrating another position of the multiple way valve shown in Fig. 12.

The piston chamber is provided with an inlet 80 which is shown connected to a water supply pipe 81 by a three way valve 82, the cock 83 of which has a right angle passage formed by two radial tracts 84, 85. By turning said cock 90 degrees in a clockwise direction from the position shown, communication will be established between inlet 80 of the piston chamber and exhaust pipe 86, as shown in Fig. 13.

When this is done the water contained in the piston chamber can be expelled through exhaust pipe 86 while spring 77 returns the piston and the pressure exerting member to their normal position.

Like in the previous case, the pressing chamber is provided with an inlet 87 just below the level reached by the shoulder 88 formed in the pressure exerting member at the point of connection between its upper portion 75 and its lower portion 76. Said inlet 87 is connected by a pipe 89 to an outlet 90 provided through the wall of the piston chamber just above the lowermost position reached by the upper surface of piston 74.

By virtue of this arrangement when water is admitted to the piston chamber, the piston will descend causing the pressing of the fruit to take place in the manner hereinbefore explained, and when the lowermost position of the piston has been reached, water within the piston chamber will automatically be discharged through pipe 89, into the pressing chamber, rinsing said chamber and causing the juice adhering to its surfaces to be discharged in the receptacle below. As soon as this is done, cock 83 is turned to the position of Fig. 13, and spring 87 will return the piston and pressure exerting member to their normal position. It is therefore sufficient to set the cock in one or the other of two extreme positions instead of successively setting it in three different positions as called for by the arrangement previously described.

It is, of course, also possible to operate the pressure exerting member independently of the pressure of the water available. For instance, in Fig. 14, we illustrate an arrangement where the force necessary to depress pressure exerting member 91 is exerted by a hand lever 92, connected to the stem 93 of said pressure exerting member by a link 94.

Lever 92 is shown pivotally mounted at 95 onto a bracket 96 upwardly extending from the stand 97. A spring normally retains the pressure exerting member and parts connected thereto in their uppermost position. It will be understood that independent means may be provided for flushing the pressing chamber after the juice has been forced out of the fruit.

On the other hand, it is also possible to cause the flushing operation to take place automatically upon the pressure exerting member reaching its lowermost position. A suitable arrangement to this end is illustrated in said Fig. 14 where 99 designates a two way cock which may establish or cut off communication between a water supply pipe 100 and a passage 101 leading to the pressing chamber.

Said cock 99 is provided with an angular passage formed by two radial tracts 102, 103 and is normally held in its inoperative position by a link 104 connecting lever 92 with an arm 105 attached to or integral with said cock.

When lever 92 is depressed, cock 102 is turned in a counterclockwise direction, and when lever 92 reaches its lowermost position, said cock will establish direct communication between water supply pipe 100 and passage 101, causing the pressing chamber to be flushed in the manner hereinbefore explained. Lever 92 can then be released and spring 98 will automatically return all the parts to their normal position.

Figures 14, 15:
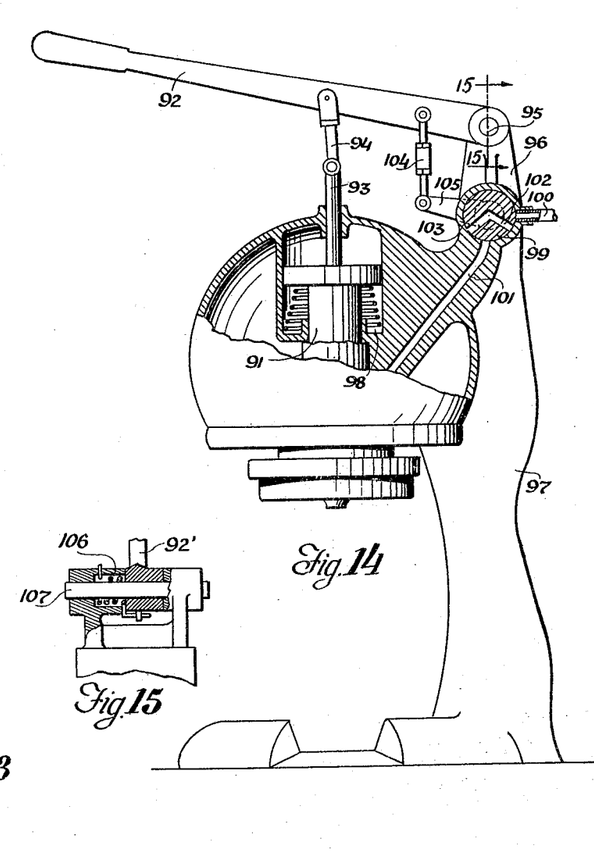
Fig. 14 is a side elevation partly broken away and sectioned of a hand operated device also embodying certain features of our invention.
Fig. 15 is a detail rear view in elevation partly broken away and sectioned through line 15—15 of Fig. 14 showing an alternative arrangement of return spring for the working parts used in the device of Fig. 14.
Figures 16, 17, 19:
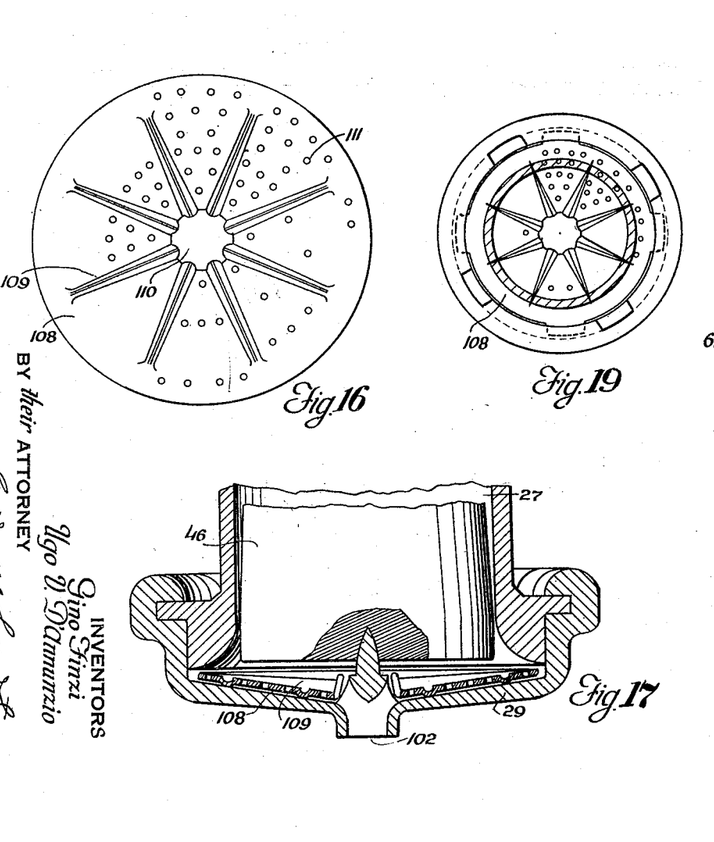
Fig. 16 is a plan view of a ribbed disk similar to that shown in Fig. 3 provided with perforations.
Fig. 17 is a fragmentary vertical view of the lower part of the pressing chamber, showing the disk of Fig. 16 in position.
Fig. 19 is a horizontal section partly broken away through line 19—19 of Fig. 18.

In Fig 15 we show a possible modification of the device shown in Fig 14 where the hand lever 92' is connected to a coil spring 106 coaxial with the pivot 107 of said lever, said spring being used together with or instead of spring 98 to return the hand lever and parts connected thereto to their normal position. It is, of course, also possible to make a ribbed disk such as shown at 39—40 provided with both cutting edges and perforations, as shown in Figs. 16, 17 where 108 is the disk provided with ribs 109 radially extending from a central opening 110 and with perforations 111. This disk is shown in connection with the device illustrated in Figs. 18, 19, which is in all other respects similar to that illustrated in Figs. 4, 5 and has its various other parts designated by reference characters corresponding to those of said Figs. 4 and 5.

In connection with the cutting ribs provided in the ribbed disks it is important to note that the cutting edge of said ribs must reach a level within the pressing chamber lower than the bottom surface of the pressure exerting member when said pressure exerting member occupies its lowermost position. In this manner, when the pressure exerting member has reached the end of its downward stroke, a clearance will remain between its bottom surface and the cutting edges of the ribs, as shown for instance in Figs. 17 and 30 sufficient to accommodate the upper side of the flattened rind so that the cutting edges will be prevented from penetrating the same. This is a necessary condition in order to make it possible for the juice to be squeezed out of the lower portion of the rind only and for forcing the essential oils contained in the rind therefrom.

From the foregoing it is seen that the pressure is applied externally of the fruit from beginning to end, so that not only is the juice forced out of the pulp but a certain proportion of the essential and aromatic oils contained in the skin is also extracted, said proportion depending upon the degree of pressure exerted and the extent of the downward stroke of the pressure exerting member. The amount of essential and aromatic oils extracted can therefore be regulated by the operation of the means controlling the movement of the pressure exerting member, that is, the multiple way valve in the case of a hydraulically operated device or the hand lever in the case of a hand operated device.

Figures 20, 21, 22, 23, 24, 25:
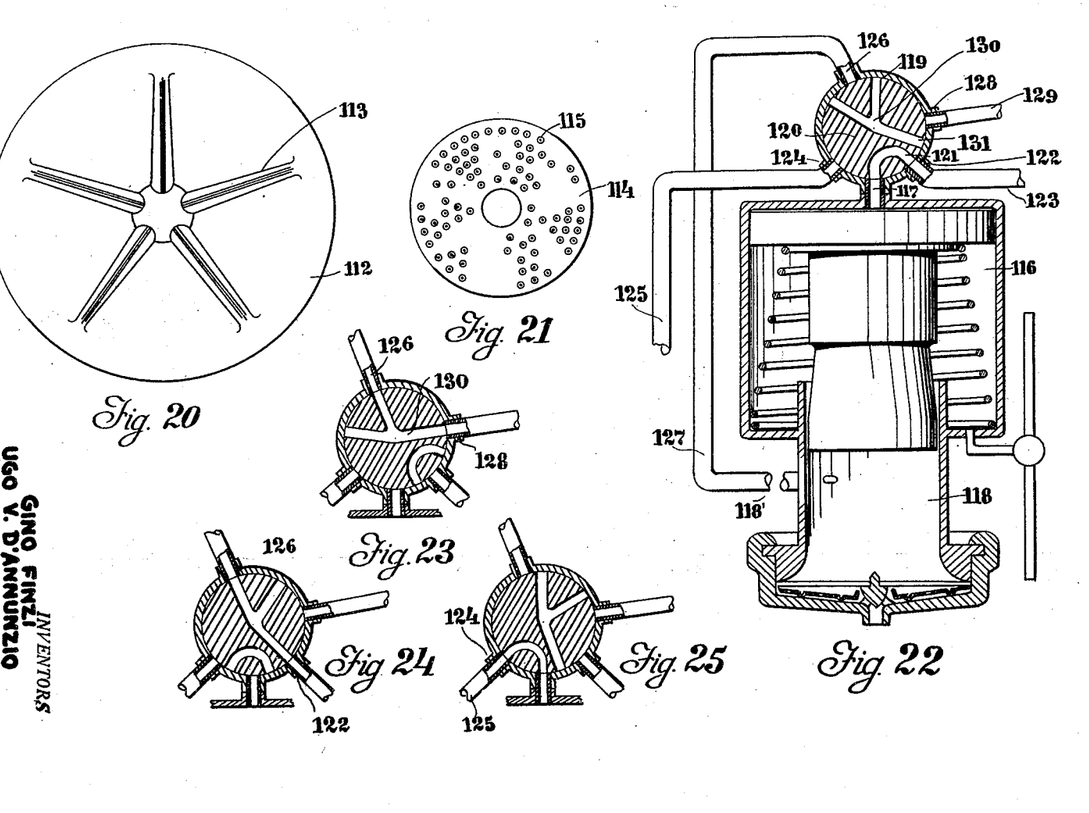
Fig. 20 is a plan view of a removable disk provided with a smaller number of radial cutting ribs than the disk shown in Fig. 3.
Fig. 21 is a plan view of a removable disk provided with a plurality of sharp points, adapted to be placed upon the removable bottom, instead of a ribbed disk such as shown in Figs. 3 and 20.
Fig. 22 is a partly diagrammatic vertical section similar to that of Fig. 18 showing a controlling valve adapted to operate in conjunction with a source of supply of another liquid in addition to water from the water supply system.
Figs. 23, 24, 25, are detail sectional views illustrating different positions of the controlling valve shown in Fig. 22.

The pressure to be exerted is also dependent upon the nature and extent of the puncturing agents provided. For instance, in Fig. 20, we show a disk 112 which is provided with only five radial ribs 113 in place of the eight ribs shown in Figs. 3, 16, 19; when such a disk provided with a smaller number of cutting edges is used therefore, a greater pressure will be required. Instead of puncturing the skin of the fruit by means of cutting edges, it is possible if desired to use a plurality of sharp points as shown in Fig. 21 where 114 designates a disk provided with a number of points 115 upwardly projecting therefrom.

Due to its simplicity, the device lends itself to a quick and efficient operation, and is entirely satisfactory from the standpoint of sanitation because its various surfaces coming into contact with the acid juices are thoroughly cleaned each time the device is operated. This feature is extremely important owing to the fact that the aromatic substances contained in the rind of oranges and lemons have a tendency to firmly adhere to the surfaces against which they are squirted during the squeezing process.

It is well known that the chief constituents of these aromatic substances are three glucosides, hesperidin, isohesperidin and aurantiamarin, and an oil which mainly consists of a terpene known as limonene. The glucosides have a tendency to jell and to stick to the surface, and the oil renders the surface somewhat greasy and also is difficult to detach therefrom. It is therefore absolutely necessary that a jet of liquid having a high velocity be projected against the surfaces thus affected, immediately after the squeezing operation is performed, if a thorough cleansing of these surfaces is to be effected. The use of water merely as a rinsing agent is not sufficient for an efficient operation, because these aromatic substances are not easily dissolved by water; the impact of water or other liquid due to its relatively high velocity, is therefore in practice, a more important factor.

In the figures previously described we have illustrated the possibility of directing a stream of water at a relatively high velocity within the pressing chamber, said water being discharged together with the juice and aromatic and essential substances in the glass underneath. However, it is frequently desirable to use carbonated water besides or instead of plain water in mixing a drink and at times it is also desirable to add still other ingredients. Furthermore, we have found that if a stream of carbonated water is admitted to the pressing chamber, its cleansing action is materially more effective than that of plain water, this being due probably to the scavenging action of the bubbles of carbonic gas under pressure that the water contains.

We have, therefore, devised an arrangement of controlling valve whereby it is possible to admit to the pressing chamber plain water or carbonated water, or both, as the operator may choose.

Figure 18:
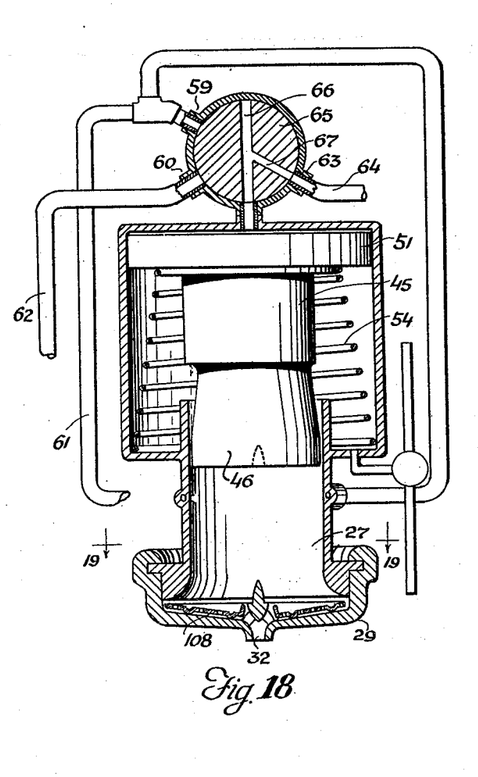
Fig. 18 is a partly diagrammatic vertical section similar to that of Fig. 5, illustrating the device equipped with a ribbed disk shown in Figs. 16, 17.

Referring to Figs. 22 to 25, in which a device somewhat similar to that shown in Fig. 18, is illustrated, 116 designates the piston chamber within which water may be admitted through inlet 117, 118 designates the pressing chamber within which a liquid stream may be admitted through inlet 118′, and 119 designates the body of the valve controlling the liquid supply and discharge.

Said valve comprises a cock 120, provided with a passage 121, that in the position of Fig. 22 is shown connecting port 122, to which water arrives through pipe 123 and inlet 117 of the piston chamber. The valve body is also provided with a port 124 from which extends a tube 125 through which water from the piston chamber may be discharged when the cock is turned in a clockwise direction to the position shown in Fig. 25. Said valve body is also provided with another port 126, which is connected to inlet 118 by a tubular connection 127 and a port 128 to which is connected a tube 129 adapted to supply carbonated water.

Cock 120 is also provided with another Y-shaped passage 130, one of the legs 131 of which may be caused to register with port 128 or port 122, causing one or the other of the other two legs to register with port 126. Thus if cock 120 is rotated in a counter-clockwise direction to the position of 123, passage 130 will establish communication between port 128 and port 126, and carbonated water will be admitted to the pressing chamber. If the cock is rotated in a clockwise direction to the position of 124, said passage 130 will establish communication between port 122 and port 126, so that in this case plain water will be admitted to the pressing chamber.

It is obvious, therefore, with such an arrangement the operator may prepare a drink which may or may not contain carbonated water, and which may or may not contain plain water, a thorough cleansing of the surfaces of the pressing chamber and the pressure exerting member being assured in either case.

With a somewhat similar arrangement it is also possible to cause the water contained in the piston chamber to be discharged through the pressing chamber, instead of being discharged through a separate outlet. Such an arrangement is illustrated in Figs. 26 to 29, where the inlet 132 of the pressing chamber is connected by a tubular connection 133 to port 134 of valve body 135. 136 designates the piston chamber to which water may be admitted through inlet 137. The valve body is also provided with a port 138 which is connected with water supply pipe 139, and a port 140 to which is connected a carbonated water pipe 141.

Figures 26, 27, 28:
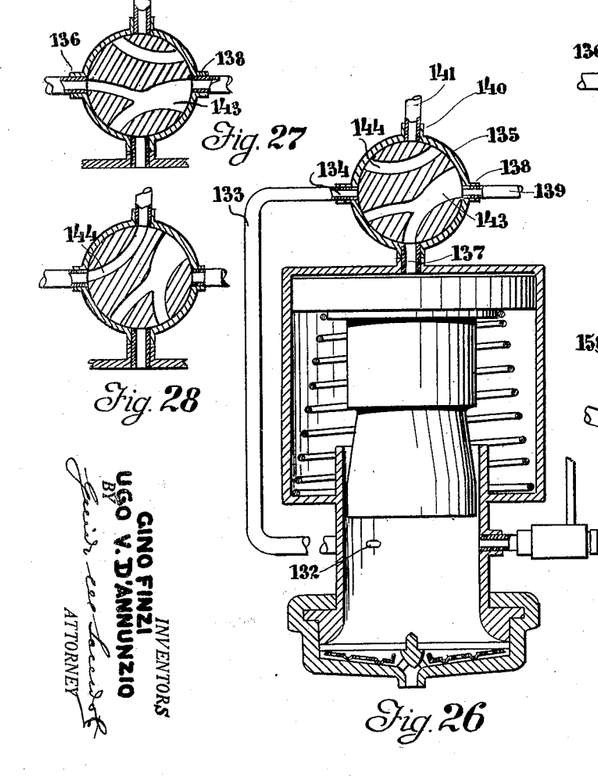
Fig. 26 is a partly diagrammatic vertical section similar to that of Fig. 22 in which the water from the piston chamber is discharged directly into the pressing chamber.
Figs. 27, 28, 29 are detail sectional views illustrating different positions of the controlling valve shown in Fig. 26.

The cock 142 is provided with a Y-shaped passage 143, that in the position of Fig. 26 is shown establishing communication between port 138 and piston chamber inlet 137. If the cock is rotated in a clockwise direction to the position of Fig. 27, it will be seen that passage 143 will now establish communication between port 138 and port 134, so that water will be admitted to the pressing chamber.

Figures 29, 30, 31:
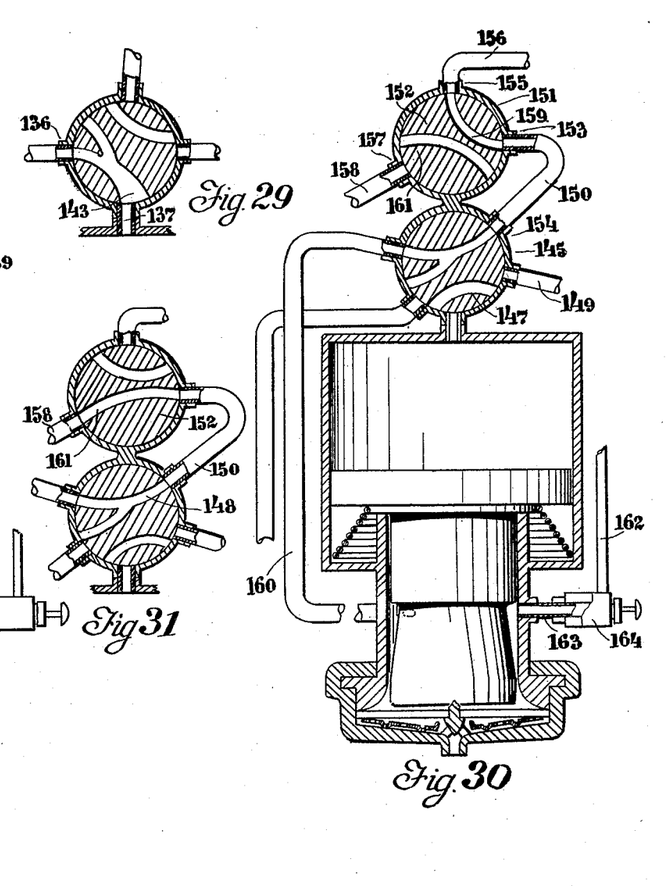
Fig. 30 is a partly diagrammatic vertical section similar to that of Fig. 22, in which a twin controlling valve is provided.
Fig. 31 is a detail sectional view illustrating a different position of one of the cocks of the controlling valve.

If the movement of the cock in a clockwise direction is continued to the position of Fig. 29, passage 143 will instead establish communication between inlet 137 and port 134, thus causing the water contained within the piston chamber to be discharged through tubular connection 133 into the pressing chamber.

Said cock is provided with a passage 144 which is adapted to establish communication between ports 134, 140, if said cock is rotated in a counter-clockwise direction to the position of Fig. 28, in which case carbonated water will be admitted to the pressing chamber.

As stated, it may in certain cases be desirable to provide facilities for supplying other ingredients instead of or besides carbonated water and plain water. For instance, in Figs. 30, 31, we show a device which is quite similar to the one shown in Figs. 22 to 25, except that said device besides being provided with a valve body 145 in which is rotatably mounted a cock 146 provided with passages 147, 148, controlling the supply of plain water through tube 149 and a supply of some other liquid ingredient through tube 150, also comprises another valve body 151 in which is rotatably mounted a cock 152.

Said valve body 151 is provided with a port 153 which is connected to port 154 of valve body 145 by tube 150. Said valve body 151 is also provided with a port 155 to which carbonated water may be admitted by means of tube 156 connected therewith and a port 157 to which some other ingredient, such as grape juice, for instance, may be admitted through pipe 158 connected therewith.

Cock 152 is provided with a passage 159 that in the position of Fig. 30 is shown establishing communication between ports 155, 153, so that carbonated water may be admitted to tubular connection 150 and passage 148 and to the pressing chamber through tubular connection 160. Cock 152 is also provided with another passage 161 that will establish communication between ports 153, 157, if said cock is rotated in a counter-clockwise direction to the position of Fig. 31. In this case, grape juice or whatever other ingredient is supplied through tube 158 will be delivered through tube 150, passage 148 and tubular connection 160 to the pressing chamber.

The arrangement last described therefore makes it possible not only to supply water or carbonated water to the pressing chamber at will, but also makes it possible to supply some other ingredient besides or instead of carbonated water or plain water, or both.

In many instances, it is also desirable to supply some other liquid ingredient in relatively small quantities, and in such cases it is preferable to discharge these additional ingredients directly into the pressing chamber without causing them to pass through a number of passages and tubular connections. For instance, in order to provide a phosphate drink, small quantities of a solution of hydrochloric acid are added.

In Fig. 30, therefore, we show another tube 162, leading from a source of supply of said additional ingredient directly into the pressing chamber through a tube 163 and a push valve 164 interposed therebetween. By virtue of this arrangement it is possible whenever desired to inject a small quantity of hydrochloric acid solution or whatever other ingredient may be supplied through pipe 162 into the pressing chamber.

Due to its simplicity, the device lends itself to a quick and efficient operation, and is entirely satisfactory from the standpoint of sanitation because its various surfaces coming into contact with the acid juices are thoroughly cleaned each time the device is operated.

The hydraulically operated type of device is especially convenient to use because it can be readily connected to any water supply system and is therefore operable at a negligible cost. This type of device also presents the advantage over electrically operated devices of being entirely free of danger due to poor insulation, short circuits, etc.

Devices other than those illustrated and described may be made embodying our inventive idea without departing from the spirit of our invention; the drawings will therefore be understood as being intended for illustrative purposes only, and not in a limiting sense. Accordingly, we reserve the right to carry our invention into practice in all those ways and manners which may enter, fairly, into the scope of the appended claims.

We claim:

1. In apparatus for expressing juice from fruits, a chamber having an open lower end within which a fruit may be inserted, a quickly removable and replaceable member detachably connected to said chamber and adapted to close the open end of said chamber, having parts adapted to penetrate the skin of said fruit, and means for exerting pressure against said fruit so as to force it against said member.

2. In apparatus for expressing juice from fruits, a chamber within which a fruit may be inserted, one of the ends of said chamber having a larger diameter than the rest of said chamber and having parts adapted to penetrate the skin of said fruit, said enlarged end having means for discharging from said chamber the juice pressed out of said fruit, means for exerting pressure against said fruit so as to force it against said end, and means for directing a stream of liquid against the walls of said chamber.

3. In apparatus for expressing juice from fruits, a chamber within which a fruit may be inserted, one of the ends of said chamber having parts adapted to penetrate the skin of said fruit, and having means for discharging from said chamber the juice pressed out of said fruit, a plunger movable in said chamber from retracted position to pressure applying position for exerting pressure against said fruit so as to force it against said end, said plunger forming, with the wall of said chamber, a relatively narrow annular passage, and means for directing a stream of liquid under pressure within said passage when the plunger is in pressure-applying position.

4. In apparatus for expressing juice from fruits, a chamber within which a fruit may be inserted, one of the ends of said chamber having parts adapted to penetrate the skin of said fruit, and having means for discharging from said chamber the juice pressed out of said fruit, means for exerting pressure against said fruit so as to force it against said end, a plurality of sources of supply of liquids under pressure, and means for selectively admitting any one of said liquids to said chamber.

5. In apparatus for expressing juice from fruits, a chamber within which a fruit may be inserted, one of the ends of said chamber having parts adapted to penetrate the skin of said fruit, and having means for discharging from said chamber the juice pressed out of said fruit, means for exerting pressure against said fruit so as to force it against said end, a plurality of sources of supply of liquids under pressure, and means for selectively directing a stream of any one of said liquids against the walls of said chamber.

6. In apparatus for expressing juice from fruits, a chamber within which a fruit may be inserted, one of the ends of said chamber having parts adapted to penetrate the skin of said fruit, and having means for discharging from said chamber the juice pressed out of said fruit, a plunger for exerting pressure against said fruit so as to force it against said end, said plunger forming, with the wall of said chamber, a relatively narrow annular passage, a plurality of sources of supply of liquids under pressure, and means for selectively directing a stream of any one of said liquids, within said passage.

7. In apparatus for expressing juice from fruits, a chamber having an open lower end within which a fruit can be inserted, a member having parts adapted to penetrate the skin of said fruit adapted to close the open end of said chamber, a quick detachable connection between said member and said chamber, means for exerting pressure against said fruit so as to force it against said member, and means for directing a stream of liquid against the walls of said chamber.

8. In apparatus for expressing juice from fruits, a chamber having an open end within which a fruit can be inserted, a member having parts adapted to penetrate the skin of said fruit adapted to close the open end of said chamber, a quick detachable connection between said member and said chamber, a plunger for exerting pressure against said fruit so as to force it against said member, said plunger forming, with the wall of said chamber, a relatively narrow annular passage, and means for directing a stream of liquid under pressure within said passage.

9. In apparatus for expressing juice from fruits, a chamber having an open lower end within which a fruit can be inserted, a member adapted to close the open end of said chamber, a quick detachable connection between said member and said chamber, said member having a spiked portion over which the fruit can be placed previous to its insertion within said chamber, and having cutting edges also adapted to penetrate the skin of said fruit when pressure is exerted against said fruit, means for exerting pressure against said fruit so as to force it against said member, and means for directing a stream of liquid against the walls of said chamber.

10. In apparatus for expressing juice from fruits, a chamber within which a fruit may be inserted, one of the ends of said chamber having a larger diameter than the rest of said chamber and having parts adapted to penetrate the skin of said fruit, said enlarged end having means for discharging from said chamber the juice pressed out of said fruit, means for exerting pressure against said fruit so as to force it against said end of large diameter, means for directing a stream of liquid against the walls of said chamber, and hydraulically operated means for actuating said pressure exerting means.

11. In apparatus for expressing juice from fruits, a chamber within which a fruit may be inserted, one of the ends of said chamber having parts adapted to penetrate the skin of said fruit, and having means for discharging from said chamber the juice pressed out of said fruit, a plunger for exerting pressure against said fruit so as to force it against said end, said plunger forming, with the wall of said chamber, a relatively narrow annular passage, means for directing a stream of liquid under pressure within said passage, a piston integral with said plunger, and means for admitting a fluid under pressure behind said piston.

12. In apparatus for expressing juice from fruits, a chamber within which a fruit may be inserted, one of the ends of said chamber having parts adapted to penetrate the skin of said fruit, and having means for discharging from said chamber the juice pressed out of said fruit, a plunger for exerting pressure against said fruit so as to force it against said end, said plunger forming, with the wall of said chamber, a relatively narrow annular passage, means for directing a stream of liquid under pressure within said passage, a piston integral with said plunger, a piston chamber, means for admitting water to said piston chamber, means for discharging said water therefrom, and a multiple way valve controlling the admission of water to and its discharge from said piston chamber, and the supply of liquid to said fruit pressing chamber.

13. In apparatus for expressing juice from fruits, a chamber within which a fruit may be inserted, one of the ends of said chamber having parts adapted to penetrate the skin of said fruit, and having means for discharging from said chamber the juice pressed out of said fruit, a plunger for exerting pressure against said fruit so as to force it against said end, said plunger forming, with the wall of said chamber, relatively narrow annular passage, a plurality of sources of supply of liquids under pressure, a piston integral with said plunger, a piston chamber, means for admitting water to said piston chamber, means for discharging said water therefrom, and a multiple way valve controlling the admission of water to and its discharge from said piston chamber, and selectively controlling the supply of a stream of any one of said liquids, to said passage.

14. An apparatus of the class described comprising, in combination, a closed top chamber within which a citrus fruit may be inserted, a removable bottom therefor, having parts adapted to penetrate the skin of said fruit, a member movable in said chamber from a retracted position to a pressure-applying position adapted to press said fruit against said bottom, means for operating said member, and means for flushing said member when the latter is in pressure-applying position.

15. An apparatus of the class described comprising, in combination, a chamber within which a citrus fruit may be inserted, a removable bottom therefor, having parts adapted to penetrate the skin of said fruit, a member adapted to press said fruit against said bottom, the top of said chamber closed by said member a piston chamber, a piston operatively associated with said member, movable therein, means for connecting to or disconnecting said piston chamber to a source of supply of water under pressure, and means for flushing said first mentioned chamber.

16. In apparatus for expressing juice from fruits, a chamber having an open end within which a fruit can be inserted, a quickly removable and replaceable member adapted to close the open end of said chamber, said member having a spiked portion over which the fruit can be placed previous to its insertion within said chamber, and having cutting edges also adapted to penetrate the skin of said fruit when pressure is exerted against said fruit, a plunger for exerting pressure against said fruit so as to force it against said member, said plunger forming, with the wall of said chamber, a relatively narrow annular passage, means for directing a liquid under pressure within said passage, a piston integral with said plunger, a piston chamber, means for admitting water to said piston chamber, means for discharging said water therefrom, and a multiple way valve controlling the admission of water to and its discharge from said piston chamber, and the supply of liquid to said passage.

17. In apparatus for expressing juice from fruits, a chamber having an open end within which a fruit can be inserted, a quickly removable and replaceable member adapted to close the open end of said chamber, said member having a spiked portion over which the fruit can be placed previous to its insertion within said chamber, and having cutting edges also adapted to penetrate the skin of said fruit when pressure is exerted against said fruit, a plunger for exerting pressure against said fruit so as to force it against said member, said plunger forming, with the wall of said chamber, a relatively narrow annular passage, a plurality of sources of supply of liquids under pressure, a piston integral with said plunger, a piston chamber, means for admitting water to said piston chamber, means for discharging said water therefrom, and a multiple way valve controlling the admission of water to and its discharge from said piston chamber, and selectively controlling the supply of a stream of any one of said liquids, to said passage.

18. In apparatus for expressing juice from fruits, a chamber within which a fruit may be inserted, one of the ends of said chamber having parts adapted to penetrate the skin of said fruit, and having means for discharging from said chamber the juice pressed out of said fruit, means for exerting pressure against said fruit so as to force it against said end, a source of supply of water under pressure, a source of supply of carbonated water, and means for selectively directing a stream of either liquid against the walls of said chamber.

19. Apparatus for expressing juice from fruits, comprising a chamber, a plunger movable therein from retracted position to pressure-applying position, a passage defined by the wall of said chamber and said plunger, and means for admitting liquid into said passage when the plunger is in pressure-applying position.

20. Apparatus for expressing juice from fruits, comprising a chamber, a plunger movable therein from retracted position to pressure-applying position, said plunger having a pressure-applying surface and a reduced portion adjacent said pressure-applying surface, a passage defined by the wall of said chamber and the reduced portion of said plunger, and means for admitting liquid into said passage when the plunger is in pressure-applying position.

UGO V. D'ANNUNZIO.
GINO FINZI.